United States Patent
Uchida et al.

(10) Patent No.: US 6,748,922 B2
(45) Date of Patent: Jun. 15, 2004

(54) KNOCK CONTROL APPARATUS FOR INTERNAL COMBUSTION ENGINE

(75) Inventors: Toshio Uchida, Hyogo (JP); Kimihiko Tanaya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/418,098

(22) Filed: Apr. 18, 2003

(65) Prior Publication Data

US 2004/0074476 A1 Apr. 22, 2004

(30) Foreign Application Priority Data

Oct. 21, 2002 (JP) ........................................ 2002-305889

(51) Int. Cl.[7] ................................................. F02P 5/00
(52) U.S. Cl. ................ 123/406.38; 73/35.08; 123/406.21
(58) Field of Search .................. 123/406.21, 406.37, 123/406.38; 73/35.08

(56) References Cited

U.S. PATENT DOCUMENTS

| | | | |
|---|---|---|---|
| 5,836,285 A | * 11/1998 | Aoki et al. | 123/406.37 |
| 5,900,536 A | * 5/1999 | Mogi et al. | 73/35.08 |
| 5,905,193 A | * 5/1999 | Hashizume et al. | 73/35.09 |
| 5,955,664 A | * 9/1999 | Aoki et al. | 73/117.3 |
| 6,234,146 B1 | 5/2001 | Tanaya et al. | |
| 6,311,672 B1 | * 11/2001 | Morishita et al. | 123/406.36 |
| 6,427,662 B2 | * 8/2002 | Tanaya et al. | 123/406.29 |
| 6,561,163 B1 | * 5/2003 | Takahashi et al. | 123/406.21 |

FOREIGN PATENT DOCUMENTS

JP    10-9108 A    1/1998

* cited by examiner

*Primary Examiner*—John Kwon
(74) *Attorney, Agent, or Firm*—Sughrue Mion, PLLC

(57) ABSTRACT

A knock control apparatus normalizes a knock frequency magnitude and a background noise level to substantially the same levels in all the engine operating conditions in consideration of a variation in an ionic current level due to an environment, the number of revolutions per minute of the engine, an engine load, etc. A frequency magnitude calculation part includes a frequency magnitude detector for detecting the magnitude of a specific frequency based on an output of an ionic current detector, an ionic current area calculator for calculating an ionic current area in a prescribed range during the combustion stroke of a cylinder concerned based on the output of the ionic current detector, a corrector for correcting the detected specific frequency magnitude based on the calculated ionic current area, a knock determiner for determining based on the corrected specific frequency magnitude whether the engine is knocking, and a control parameter correction amount setter for setting an amount of correction for an ignition timing control parameter based on the determination result.

6 Claims, 5 Drawing Sheets

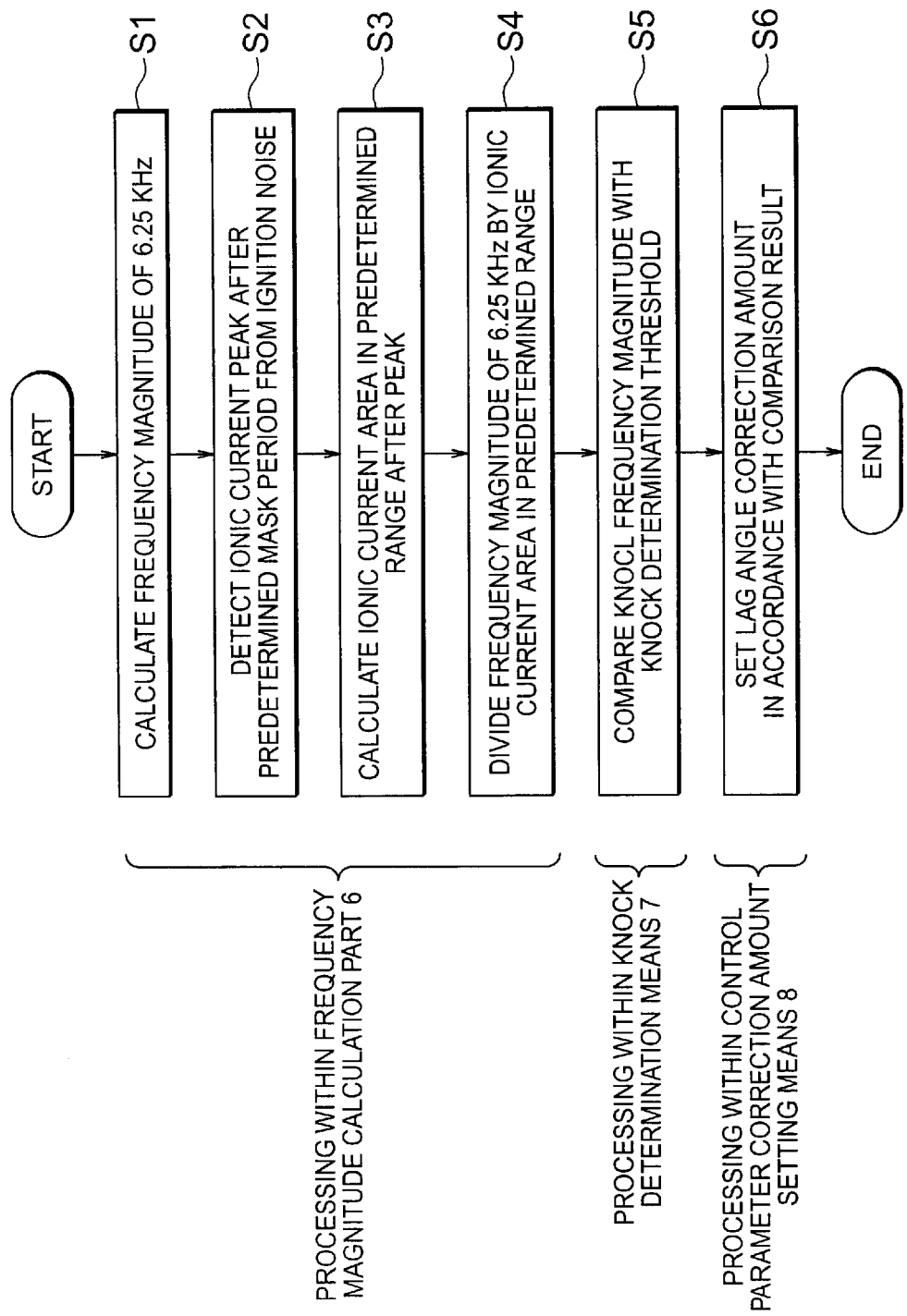

RELATION BETWEEN IONIC CURRENT LEVEL AND KNOCK FREQUENCY
(UPON OCCURRENCE OF KNOCKINGS OF THE SAME MAGNITUDE)

KNOCK CONTROL APPARATUS FOR INTERNAL COMBUSTION ENGINE

BACKGROUND OF THE INVENTION

1. Field of the Invention

The present invention relates to a knock control apparatus for an internal combustion engine that corrects control amounts or variables of the internal combustion engine in a direction to suppress knocking by detecting the occurrence of knocking in the internal combustion engine from an ionic current generated by combustion of an air fuel mixture therein. More particularly, it relates to a knock control apparatus for an internal combustion engine that is capable of preventing erroneous knock detection and detection miss when the magnitude of ionic current is varied due to differences among the rotational speed (or number of revolutions per minute) of the engine, load, environment, etc.

2. Description of the Related Art

Conventionally, in a knock control apparatus for an internal combustion engine, for the suppression of damage to the internal combustion engine due to the occurrence of knocking, a control amount or variable of the internal combustion engine is controlled such that it is corrected to a knock suppression side (for instance, an ignition timing retarding angle side)in accordance with the occurrence of knocking. In addition, a knock control apparatus for an internal combustion engine using an ionic current is limited in the difference in the knock detection sensitivity among the cylinders of the engine and hence effective to individually perform knock control on the respective cylinders, in view of which there have been conventionally proposed a variety of knock control apparatuses of such a type.

In general, in an internal combustion engine, a mixture of air and fuel introduced into the combustion chamber of each engine cylinder is compressed by the rising or compressing motion of a corresponding piston and fired by an electric spark generated by impression of a high voltage on a spark plug in the combustion chamber to produce a force that pushes down the piston so as to be taken out as output power. At this time, molecules in the combustion chamber are electrically dissociated or ionized when the mixture combusts in the combustion chamber, so an ionic current flows owing to the movements of ions through the spark plug when a high voltage is impressed on the spark plug (electrodes for ionic current detection) in the combustion chamber. It is known that the ionic current thus produced changes sensitively due to pressure fluctuations in the combustion chamber, and includes vibration components corresponding to knocking. Therefore, the presence or absence of knocking can be determined based on the ionic current.

In this kind of apparatus, a background level with respect to an ionic current detection signal is set so as to prevent erroneous knock detection due to noise superposed on an ionic current. In a known knock control apparatus, for an index of the magnitude of a knock (vibration) frequency that is obtained by subjecting a knock (vibration) frequency signal to waveform shaping processing, there is set a background level (i.e., noise level determination reference) that is calculated as the sum of the mean value of the index and a dead zone range (offset value) corresponding to the operating range of the engine (for instance, see a patent document: Japanese patent application laid-open No. 10-9108).

It is also known that the ionic current varies in its current level in accordance with differences in the environments such as the number of revolutions per minute (rpm) of the engine, load, temperature, etc. A vibration component superposed on the ionic current when knocking is taking place becomes large in its amplitude when the ionic current level is large, and small when the ionic current level is small. In other words, it will be understood that even if there took place knocking of the same magnitude, the result of an analysis on the frequency magnitude of an ionic current generated is varied according to a difference in the ionic current level. In the apparatus described in the above-mentioned patent document, when the knock frequency magnitude is varied in accordance with a variation in the level of the ionic current detection signal due to changes in the rotational speed (or number of revolutions per minute), load, environment, etc., an optimal offset value of the background level may often vary depending on the engine operating conditions. Thus, it is expected that if the offset of the background level is fixed over all the engine operating conditions, erroneous knock detection or detection miss will be caused. This problem can, however, be mostly solved if the offset value is mapped based on the relation between "the engine rotational speed (rpm)" and the "engine load", for instance. However, it may be feared that when a difference between adjacent map values is great in the operating conditions between adjacent map axes, an optimal offset value cannot be obtained, thus making it impossible to ensure good knock controllability.

SUMMARY OF THE INVENTION

The present invention is intended to obviate the problems as referred to above, and has for its object to provide a knock control apparatus for an internal combustion engine which has substantially the same knock controllability in all the operating conditions of the internal combustion engine and does not need various corrections according to the operating conditions by normalizing the knock frequency magnitude and the level of background noise to substantially the same levels in all the operating conditions while taking into consideration a variation in the level of ionic current based on environments, the rotational speed (or the number of revolutions per minute) of the engine, engine load, etc.

Bearing the above object in mind, the present invention resides in a knock control apparatus for an internal combustion engine which includes: an ionic current detector for detecting an ionic current generated in a combustion chamber of the internal combustion engine immediately after ignition of an air fuel mixture therein; a frequency magnitude calculator for extracting the magnitude of a specific frequency from the ionic current; a knock determiner for determining based on the specific frequency magnitude whether the internal combustion engine is knocking; and a control parameter correction amount setter for setting an amount of correction for an ignition timing control parameter based on the result of the determination of the knock determiner. The frequency magnitude calculator includes: a frequency magnitude detector for detecting the specific frequency magnitude based on an output of the ionic current detector; an ionic current area calculator for calculating an ionic current area in a prescribed range within the combustion stroke of a cylinder concerned based on the output of the ionic current detector; and a corrector for correcting the detected specific frequency magnitude based on the calculation result of the ionic current area calculator. According to this arrangement, it becomes possible to perform knock control without being influenced by the magnitude of the ionic current level.

The above and other objects, features and advantages of the present invention will become more readily apparent to those skilled in the art from the following detailed description of a preferred embodiment of the present invention taken in conjunction with the accompanying drawings.

BRIEF DESCRIPTION OF THE DRAWINGS

FIG. 3 is a flow chart illustrating processing from ionic current detection to the setting of an amount of ignition timing retard angle according to the present invention.

DESCRIPTION OF THE PREFERRED EMBODIMENT

Now, a preferred embodiment of the present invention will be described below in detail while referring to the accompanying drawings.

Figure 1:
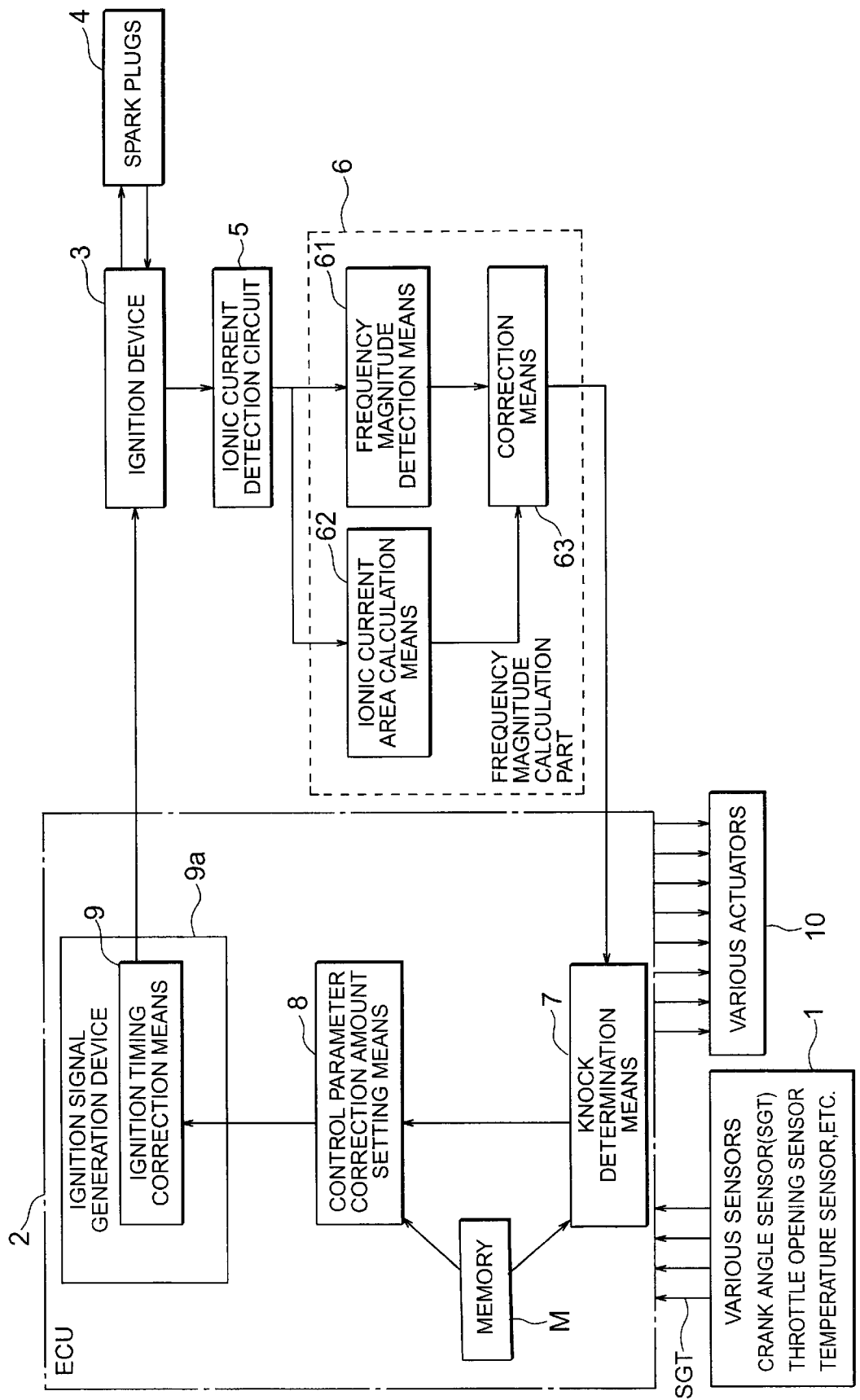
FIG. 1 is a block diagram illustrating the construction of a knock control apparatus for an internal combustion engine according to one embodiment of the present invention.
Figure 2:
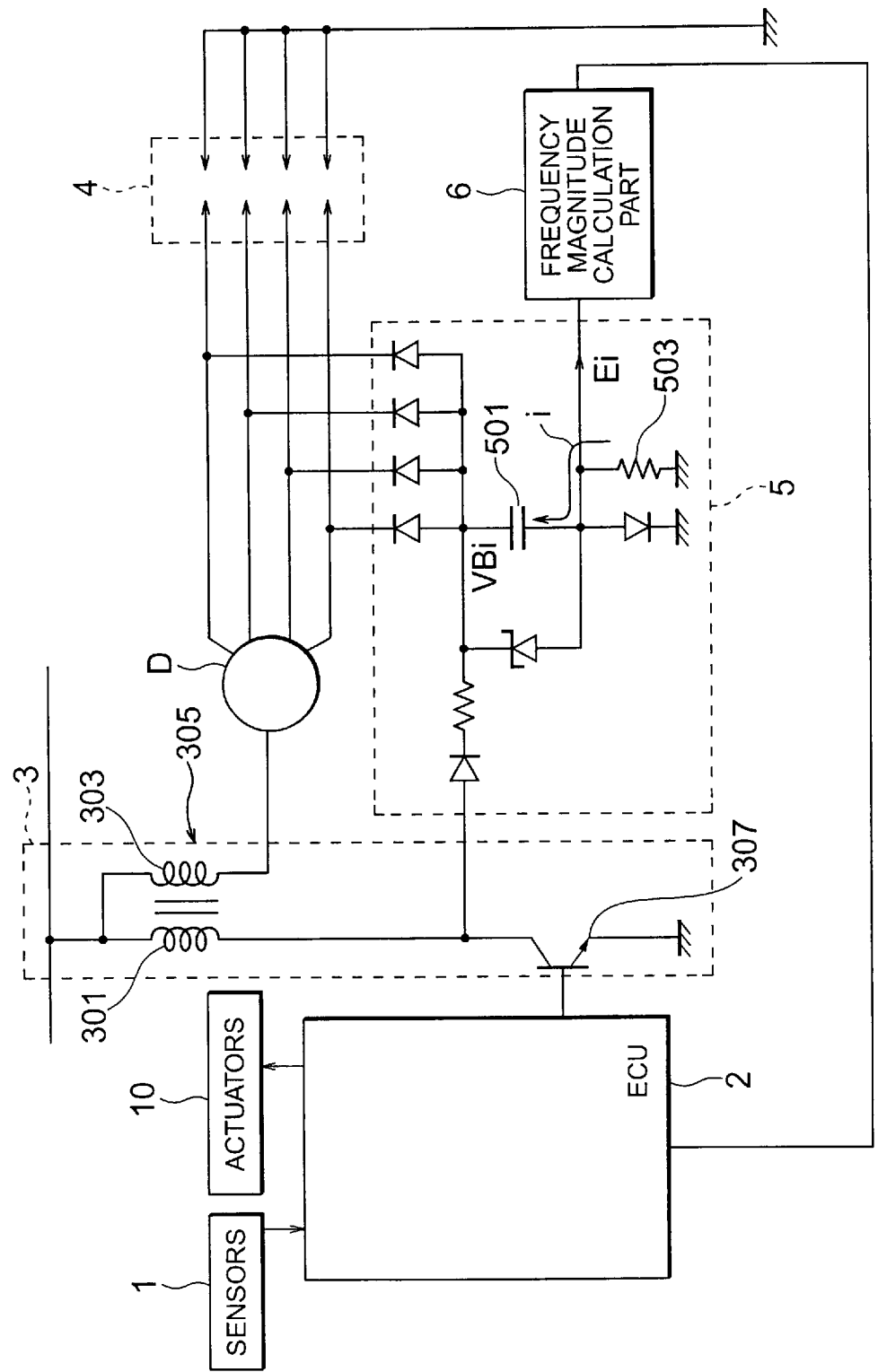
FIG. 2 is a view illustrating one example of the circuit configuration of an ignition device, spark plugs and an ionic current detection circuit of the knock control apparatus of FIG. 1.

FIG. 1 is a view that illustrates the construction of a knock control apparatus for an internal combustion engine according to one embodiment of the present invention. In addition, FIG. 2 is a view that illustrates one example of the circuit configuration of an ignition device 3, spark plugs 4 and an ionic current detection circuit 5 of the knock control apparatus shown in FIG. 1. In FIG. 1, an ECU 2 is comprised of a microcomputer. Also, it is assumed that only one of the spark plugs 4 is typically illustrated in FIG. 1, but four spark plugs 4 are shown as connected to a distributor D in FIG. 2. A variety of kinds of sensors 1 include a throttle opening sensor, a crank angle sensor, a temperature sensor, etc., which are all well known, and generate a variety of kinds of sensor signals indicative of the various operating conditions of the internal combustion engine. For instance, the crank angle sensor among the variety of kinds of sensors 1 outputs a crank angle signal SGT corresponding to the rotational speed or the number of revolutions per minute of the engine. Output signals from the variety of kinds of sensors 1 including the crank angle signal SGT are input to the ECU 2 in the form of the microcomputer. The crank angle signal SGT has pulse edges indicative of the crank angle reference positions of the respective cylinders of the engine, and are used for various control calculations in the ECU 2.

The ignition device 3 includes an ignition coil 305 that has a primary winding 301 and a secondary winding 303, and a power transistor 307 that conducts and interrupts a primary current supplied to the ignition coil 305, as shown in FIG. 2. Each of the spark plugs 4 generates an ignition spark upon application of a high ignition voltage thereto from the ignition device 3, whereby the air fuel mixtures in the respective engine cylinders are ignited at respective prescribed timing. In order to detect an ionic current flowing through the gap between electrodes of each spark plug 4 upon combustion of an air fuel mixture, the ionic current detection circuit 5 includes a capacitor 501 that is a bias means for applying a bias voltage BVi to the spark plugs 4 through the ignition coil 305 in the ignition device 3, and a resistor 503 that outputs an ionic current detection signal Ei which is generated due to an ionic current i, as shown in FIG. 2.

A frequency magnitude calculation part 6 includes a frequency magnitude detection means 61, an ionic current area calculation means 62 and a correction means 63, as shown in FIG. 1, and generates an index of the magnitude of a specific frequency which is input to the ECU 2. Here, note that the processing or operation of the frequency magnitude calculation part 6 is carried out by a module that uses a microcomputer (or DSP (digital signal processor)) separate from the ECU 2. However, the ECU 2 may directly take in the ionic current to perform such processing, or an analog circuit, which is built in or separate from the ECU 2, may be used for this purpose.

The ECU 2 is provided with a knock determination means 7, a control parameter correction amount setting means 8, an ignition timing correction means 9 in an ignition timing generation device 9a, and a memory M that stores threshold values and maps used by the respective means as required. The knock determination means 7 outputs a comparison result indicative of the occurrence of knocking when the magnitude of the specific frequency input from the frequency magnitude calculation part 6 exceeds a threshold value. The control parameter correction amount setting means 8 sets an amount of correction for a control parameter (e.g., an amount of ignition timing retard angle in this example) corresponding to the comparison result (e.g., an amount in excess of the threshold value) that is input from the knock determination means 7 and that indicates the occurrence of knocking, whereby the ignition timing correction means 9 corrects the ignition timing so as to retard it in accordance with the amount of correction thus set.

The variety of kinds of sensors 1 including the crank angle sensor input a variety of information such as temperature information, etc., indicative of the operating conditions of the engine to the ECU 2, so that various actuators 10 connected to the ECU 2 are driven by control signals corresponding to the engine operating conditions from the ECU 2. Though not illustrated herein, input and output interfaces and D/A converters or A/D converters are inserted between the ECU 2 and the ignition device 3, and between the ECU 2 and the variety of kinds of sensors 1, and between the ECU 2 and the various actuators 10, respectively.

Now, a more concrete explanation will be made of the operation of this embodiment based on the constructional views shown in FIGS. 1 and 2 and a flow chart of FIG. 3 that illustrates processing from the detection of an ionic current to the setting of an amount of ignition timing retard angle. When an ignition signal is generated by the ECU 2, a high voltage generated by the ignition device 3 is impressed through the distributor D on one of the spark plugs 4, whereby an electric discharge is caused in the gap between the electrodes of that spark plug 4, thereby igniting the air fuel mixture in the corresponding engine cylinder. At this time, a part of ignition energy is charged to the capacitor 501 as a bias voltage VBi in the ionic current detection circuit 5. This bias voltage VBi is applied to that spark plug 4 through the ignition device 3, thereby causing the ions generated upon combustion of the air fuel mixture to move to generate an ionic current i. The ionic current i thus generated is detected by the ionic current detection circuit 5 as an ionic current detection signal Ei, based on which an ionic current area in a specified period during the combustion stroke is obtained by the ionic current area calculation means 62 in the frequency magnitude calculation part 6. On the other hand, the magnitude of a specific frequency superposed on the ionic current generated when knocking is taking place is calculated by the frequency magnitude detection means 61 through a Fast Fourier Transform (FFT) analysis. It is generally known that the frequency of knocking (i.e., the frequency of vibrations of the engine caused by knocking) is in the vicinity of 6 KHz, and the magnitude of frequency of 6.25 KHz (hereinafter referred to as a knock frequency magnitude) is calculated here (step S1).

Figure 4A:
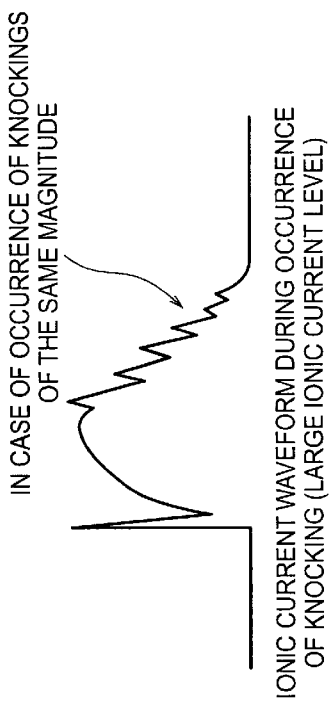
FIGS. 4A through 4D are views illustrating the ionic current waveforms and the results of respective Fast Fourier Transform (FFT) analyses when the level of an ionic current is large and small, respectively.
Figure 4B:
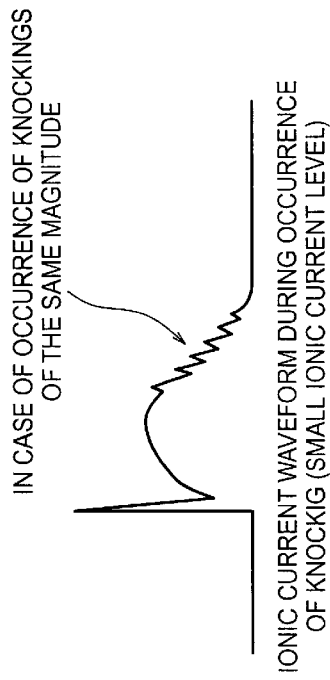
Figure 4C:
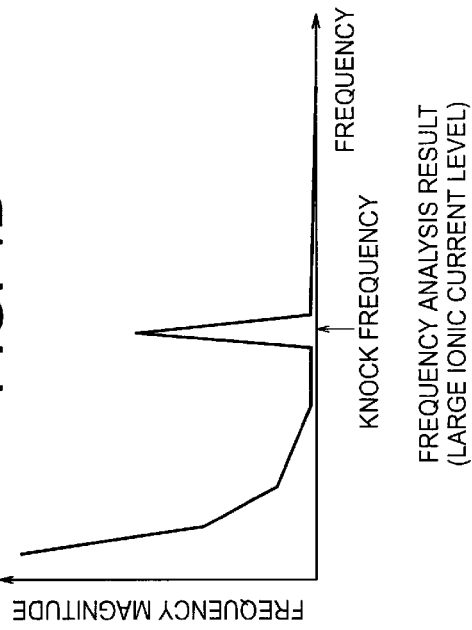
Figure 4D:
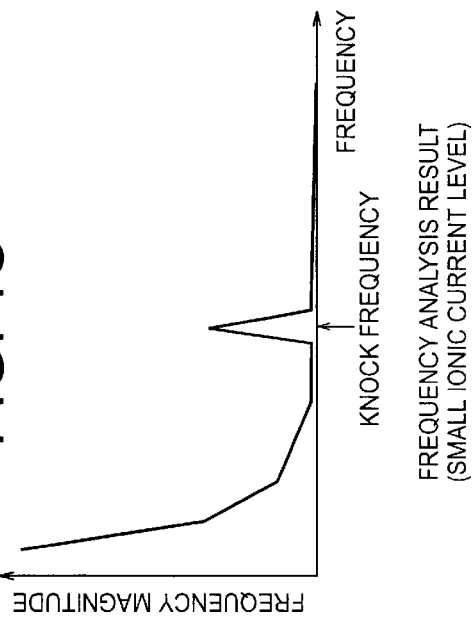

FIGS. 4A and 4B show the waveforms of an ionic current when the level of the ionic current is large and small, respectively (upon the occurrence of knocking), and FIGS. 4C and 4D show the results of FFT analyses in the respective waveforms. Here, it is assumed that there took place knocking of substantially the same magnitude in respective cases. From these views, it will be understood that the knock frequency magnitude varies along with the ionic current level, as shown therein. When the knock frequency magnitudes without any correction being made thereto are input to the knock determination means 7 as they are, the results of comparisons between the knock frequency magnitudes and the knock determination threshold value become different from each other, and hence the amounts of retard angle correction also differ from each other. The ionic current area calculation means 62 detects an ionic current peak after the lapse of a prescribed mask period from the generation of ignition noise, and calculates the area of ionic current within a prescribed range after this peak. Here, an area from the position of a second peak of the ionic current generated within a combustion stroke to a position of 800 microseconds thereafter is calculated (steps S2 and S3). However, an area of a prescribed range with the second peak being positioned at the center thereof may instead be obtained.

Figure 5A:
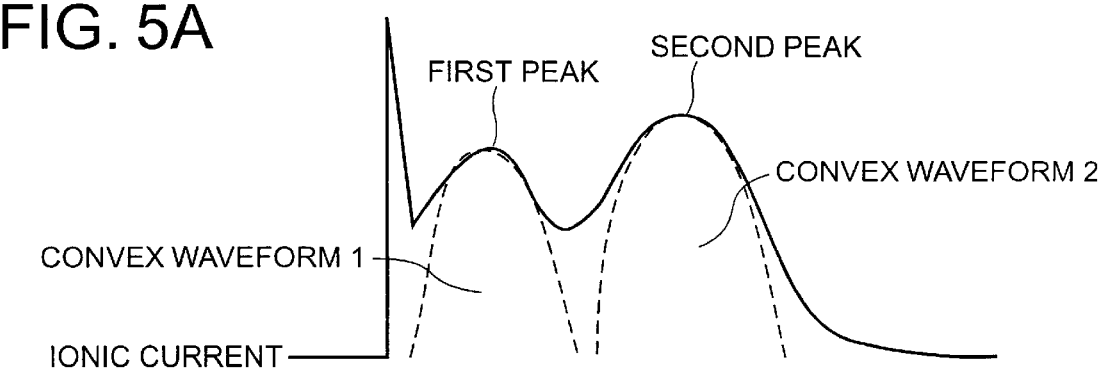
FIGS. 5A and 5B are views illustrating the relation between the waveform of an ionic current (FIG. 5A) and the internal pressure in a cylinder (FIG. 5B).
Figure 5B:
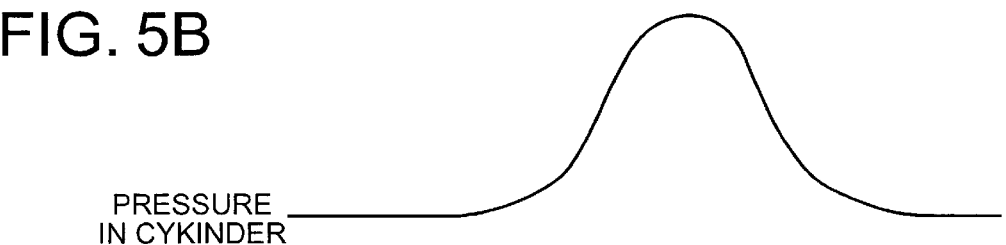

FIGS. 5A and 5B illustrate the relation between the waveform of an ionic current shown in FIG. 5A and the internal pressure in a cylinder shown in FIG. 5B. A convex waveform 1 including a first peak of the ionic current is generated by the combustion reaction of a mixture when ignited, and a convex waveform 2 including a second peak of the ionic current is generated by the cylinder internal pressure (combustion pressure) which depends on the number of revolutions per minute of the engine. It is an already known fact that knocking takes place in the vicinity of a peak of the cylinder internal pressure. Therefore, it is the most effective to use the convex waveform 2 as a correction (normalization) factor for the signal due to knocking.

A second peak detection method in this embodiment is to detect a second peak of an ionic current by providing a prescribed mask period from the generation of ignition noise so as to disregard a first peak. The mask period and an ionic current area calculation range as well may be set in accordance with each engine operating condition based on information such as the rotational speed or the number of revolutions per minute of the engine, the engine load, etc., received from the ECU 2. Incidentally, although in this embodiment, the Fast Fourier Transform (FFT) is used as a means for detecting the frequency magnitude, it is already known that the values obtained according to the FFT calculation have the same dimension as the area. Therefore, it is preferable to use the area of the ionic current for the purpose of normalizing the FFT output (nondimensioning). Here, note that in case where the means for detecting the knock frequency magnitude is a device that calculates the amplitude of engine vibrations, a similar advantageous effect can be achieved even if the normalization is effected by the mean value of the ionic current. In addition, vibrations due to knocking are generated in the vicinity of the second peak of the ionic current as described above, and hence it is effective to normalize the Fourier magnitude by using an area in the vicinity of a peak of the convex waveform 2 in which knocking vibrations can be overlapped with the ionic current. This is because the possibility of vibrations generating in portions other than in the vicinity of the second peak of the ionic current is extremely low, and hence inclusion of the area of those portions which are not so closely related to the peak of the convex waveform 2 will inadvertently lose or reduce the magnitude of the knock signal.

Although an area of the ionic current between the second peak thereof and 800 microseconds thereafter is obtained herein, an ionic current area within a generally known knock generation period (ATDC (after top dead center) 20° C.A (crank angle)—ATDC 60° C.A) may instead be obtained based on the crank angle information received from the ECU 2.

Figure 6:
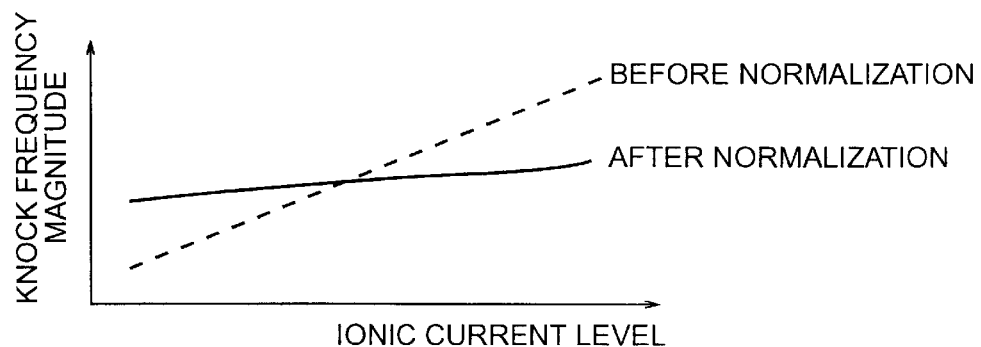
FIG. 6 is a view illustrating the relation between the ionic current level and the knock frequency magnitudes before and after the normalization thereof upon the occurrences of knocking of the same magnitude.

The knock frequency magnitude is normalized by the correction means 63 based on the output of the ionic current area calculation means 62. Here, such normalization is carried out by simply dividing the knock frequency magnitude by the ionic current area (step S4). However, the knock frequency magnitude may instead be corrected by using a correction factor that is acquired based on the ionic current area (for instance, a map of the correction factor and the ionic current area is stored in the memory M). FIG. 6 shows the relation between the ionic current level and the knock frequency magnitudes (before and after normalization) upon the occurrences of knocks of substantially the same magnitude. The knock frequency magnitudes before and after normalization are different in their units, but they are plotted on the one and same axis for relative comparison. According to the normalization of the knock frequency magnitude, there will be substantially no variation in the knock frequency magnitude due to a variation in the ionic current level depending upon the engine operating conditions, etc., so it becomes unnecessary to set knock determination threshold values for the engine operating conditions, respectively.

Here, the knock frequency magnitude thus normalized is input to the ECU 2 as a numerical value through a CAN (cable area network). However, it may be input to the ECU 2 from an I/O port as a pulse train, a voltage value or the like. The knock determination means 7 compares the normalized knock frequency magnitude with a knock determination threshold value and outputs the result of the knock determination (step S5). The control parameter correction amount setting means 8 sets an amount of ignition timing retard angle corresponding to the result of the knock determination (step S6). Then, the ignition timing correction means 9 of the ignition timing generation device 9a corrects the ignition timing so as to retard it in accordance with the amount of ignition timing retard angle thus set. FIG. 1 shows the constructional view for one cylinder alone for the sake of simplification. However, it is needless to say that similar control means may be provided for each of the plurality of cylinders (see the spark plugs 4 within a frame enclosing them in FIG. 2).

Thus, in the knock control apparatus for an internal combustion engine according to the present invention, the area of an ionic current in a prescribed range during the combustion stroke of a cylinder is calculated based on a corresponding output of the ionic current detection means, and the magnitude of a specific frequency is corrected based on the ionic current area thus calculated. A determination as to whether the internal combustion engine is knocking is then made from the corrected specific frequency magnitude, and an amount of correction for an ignition timing control parameter is set based on the result of the determination. As a result, it becomes possible to perform knock control without being influenced by the magnitude of the ionic current level.

Moreover, by dividing the specific frequency magnitude based on the ionic current area to normalize it upon correction of the specific frequency magnitude, it is possible to ensure substantially similar or uniform knock controllability regardless of the magnitude of the ionic current level.

Further, upon calculation of the ionic current area, by calculating the area of an ionic current either in a prescribed range from a peak of the ionic current or in a prescribed range that includes an ionic current peak during the combustion stroke of a cylinder concerned, it is possible to obtain a more suitable factor for normalization.

Furthermore, upon calculation of the ionic current area, by calculating the area of an ionic current in a crank angle range of ATDC 20° C.A—ATDC 60° C.A during the combustion stroke of a cylinder concerned, it is also possible to obtain a more suitable factor for normalization.

As described above, according to the present invention, there is provided a knock control apparatus for an internal combustion engine comprising: ionic current detection means for detecting an ionic current generated in a combustion chamber of the internal combustion engine immediately after ignition of an air fuel mixture therein; frequency magnitude calculation means for extracting the magnitude of a specific frequency from the ionic current; knock determination means for determining based on the specific frequency magnitude whether the internal combustion engine is knocking; and control parameter correction amount setting means for setting an amount of correction for an ignition timing control parameter based on the result of the determination of the knock determination means. The frequency magnitude calculation means comprises: frequency magnitude detection means for detecting the specific frequency magnitude based on an output of the ionic current detection means; ionic current area calculation means for calculating an ionic current area in a prescribed range within the combustion stroke of a cylinder concerned based on the output of the ionic current detection means; and correction means for correcting the detected specific frequency magnitude based on the calculation result of the ionic current area calculation means. With this arrangement, it becomes possible to perform knock control without being influenced by the magnitude of the ionic current level.

While the invention has been described in terms of a preferred embodiment, those skilled in the art will recognize that the invention can be practiced with modifications within the spirit and scope of the appended claims.

What is claimed is:

1. A knock control apparatus for an internal combustion engine comprising:

ionic current detection means for detecting an ionic current generated in a combustion chamber of the internal combustion engine immediately after ignition of an air fuel mixture therein;

frequency magnitude calculation means for extracting the magnitude of a specific frequency from said ionic current;

knock determination means for determining based on said specific frequency magnitude whether said internal combustion engine is knocking; and control parameter correction amount setting means for setting an amount of correction for an ignition timing control parameter based on the result of the determination of said knock determination means;

wherein said frequency magnitude calculation means comprises: frequency magnitude detection means for detecting said specific frequency magnitude based on an output of said ionic current detection means; ionic current area calculation means for calculating an ionic current area in a prescribed range within the combustion stroke of a cylinder concerned based on the output of said ionic current detection means; and correction means for correcting said detected specific frequency magnitude based on the calculation result of said ionic current area calculation means.

2. The knock control apparatus for an internal combustion engine as set forth in claim 1, wherein said correction means divides said detected specific frequency magnitude by the output result of said ionic current area calculation means.

3. The knock control apparatus for an internal combustion engine as set forth in claim 1, wherein said ionic current area calculation means calculates the area of an ionic current either in a prescribed range from a peak of the ionic current or in a prescribed range including a peak of the ionic current during the combustion stroke of a cylinder concerned.

4. The knock control apparatus for an internal combustion engine as set forth in claim 2, wherein said ionic current area calculation means calculates the area of an ionic current either in a prescribed range from a peak of the ionic current or in a prescribed range including a peak of the ionic current during the combustion stroke of a cylinder concerned.

5. The knock control apparatus for an internal combustion engine as set forth in claim 1, wherein said ionic current area calculation means calculates the area of an ionic current in a crank angle range of ATDC 20° C.A—ATDC 60° C.A during the combustion stroke of a cylinder concerned.

6. The knock control apparatus for an internal combustion engine as set forth in claim 2, wherein said ionic current area calculation means calculates the area of an ionic current in a crank angle range of ATDC 20° C.A—ATDC 60° C.A during the combustion stroke of a cylinder concerned.

* * * * *